US00RE33803E

United States Patent [19]

Weiss

[11] E

Patent Number: Re. 33,803

[45] Reissued Date of Patent: Jan. 21, 1992

[54] GAS LASER WITH AT LEAST ONE EXCITATION TUBE WHERETHROUGH GAS IS ACTUALLY FLOWING

[75] Inventor: Hardy P. Weiss, Hutten, Switzerland

[73] Assignee: PRC Corporation, Landing, N.J.

[21] Appl. No.: 426,570

[22] Filed: Oct. 25, 1989

Related U.S. Patent Documents

Reissue of:

[64] Patent No.: 4,704,719
Issued: Nov. 3, 1987
Appl. No.: 786,052
Filed: Oct. 10, 1985

[30] Foreign Application Priority Data

Oct. 10, 1984 [CH] Switzerland ..... 4861/84

[51] Int. Cl.[5] ..... H01S 3/03

[52] U.S. Cl. ..... 372/58; 372/61

[58] Field of Search ..... 372/58, 61, 88

[56] References Cited

U.S. PATENT DOCUMENTS

| | | | |
|---|---|---|---|
| 3,671,883 | 6/1972 | Smars | 372/58 |
| 3,720,885 | 3/1973 | Koloc | 372/58 |
| 4,274,065 | 6/1981 | Garscadden et al. | 372/58 |
| 4,457,000 | 6/1984 | Rao | 372/58 |
| 4,470,144 | 9/1984 | Sano et al. | 372/61 |
| 4,541,097 | 9/1985 | Kuwabara et al. | 372/61 |
| 4,573,162 | 2/1986 | Bakowsky et al. | 372/58 |

FOREIGN PATENT DOCUMENTS

| | | |
|---|---|---|
| 0080715 | 8/1983 | European Pat. Off. . |
| 58-178579 | 10/1983 | Japan . |
| 58-196080 | 11/1983 | Japan . |

*Primary Examiner*—William L. Sikes
*Assistant Examiner*—Susan S. Morse
*Attorney, Agent, or Firm*—Antonelli, Terry, Stout & Kraus

[57] ABSTRACT

An axial flow gas transport laser comprising an excitation tube through which gas flows along an axis of the tube, an inlet arrangement to feed gas towards the excitation tube and an outlet arrangement to discharge gas from the excitation tube. At least one of the inlet and outlet arrangements comprises a circumferential opening arrangements evenly distributed along the periphery of the excitation tube, substantially in a cross-section plane of the tube. A gas flow channel arrangement to the opening arrangement is directed at least substantially in the direction of the excitation tube axis and into the excitation tube at the opening arrangement for preventing wide-areal turbulances of the gas flowing in the excitation tube.

19 Claims, 7 Drawing Sheets

FIG. 7a
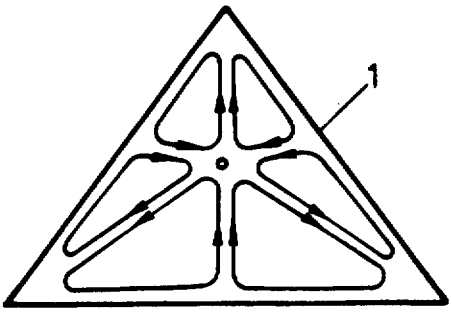
FIG. 7b
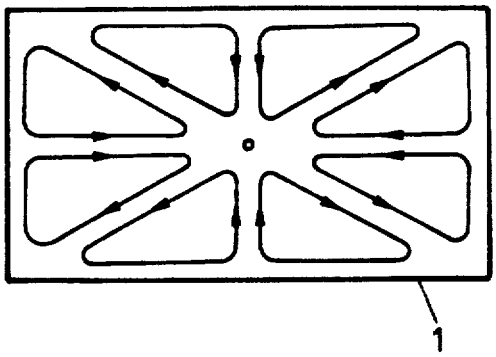
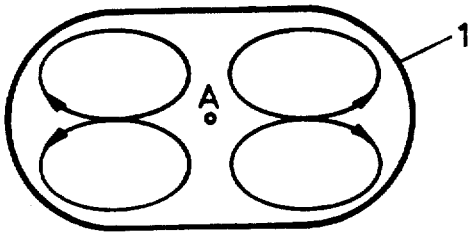
FIG. 7c
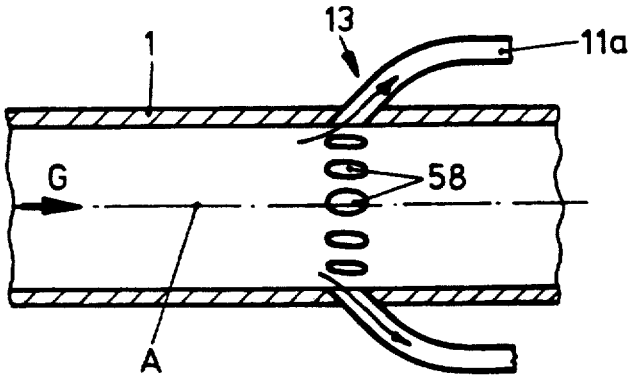
FIG. 8
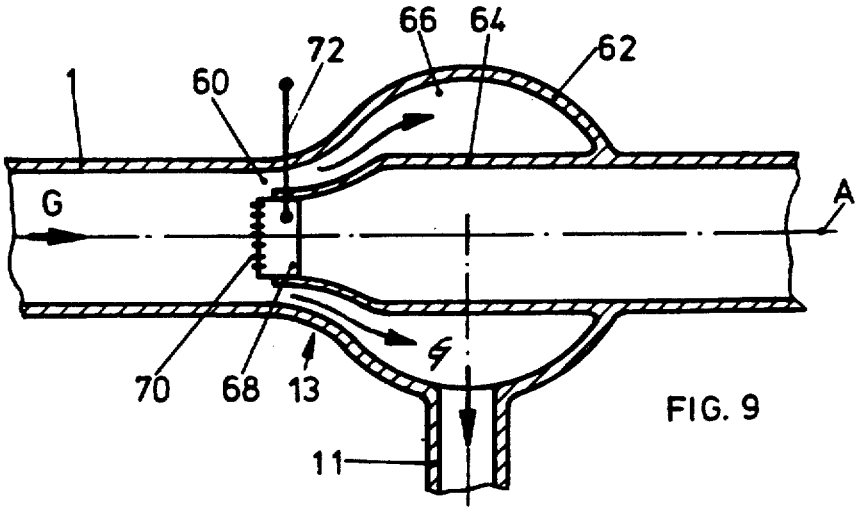
FIG. 9

GAS LASER WITH AT LEAST ONE EXCITATION TUBE WHERETHROUGH GAS IS ACTUALLY FLOWING

Matter enclosed in heavy brackets [ ] appears in the original patent but forms no part of this reissue specification; matter printed in italics indicates the additions made by reissue.

BACKGROUND AND SUMMARY OF THE INVENTION

The present invention is directed to a gas laser with at least one excitation tube wherethrough gas is axially flowing said laser comprising an electrode arrangement for electrical excitation of the gas within said tube and with at least one gas inlet and one outlet arrangement with respect to said excitation tube.

It is known that one serious problem of axial gas laser is the occurrence of wide-areal gas turbulances within the excitation tube which occurrence should be prevented. The above expression "wide-areal" which will be used further in this description shall be defined as follows:

Turbulances within a tube or a pipe are said "wide-areal" if the turbulance pattern seen in cross-sectional view has one turbulance center over the entire cross-sectional area of the tube. If turbulances occur with more than one center disposed within the tube's pipe's cross-sectional areas they are said to be "small areal".

The characteristics of turbulance along the excitation tube are highly influenced by the characteristics of a gas inlet zone and/or of a gas outlet zone for the gas with respect to the excitation tube and are mostly severely disturbed by these latter zones because in these zones a radial incoming gas flow must be directed in more axial direction at the inlet zone and a gas stream from more axial direction must be directed in more radial direction at the outlet zone which features may directly or by reaction cause said unwanted wide-areal turbulances throughout the excitation tube.

It is an object of the present invention to prevent at a gas laser of the kind mentioned above occurrence of such wide areal turbulances and especially to prevent said inlet and outlet zones to generate such turbulances. To fulfil this target inlet and/or outlet arrangements of the gas laser comprise inlet and/or outlet means for said gas which are distributed around the circumference of the excitation stage tube said means steadily leading said gas from more radial into a more axial direction with respect to said tube for inlet and/or from a more axial direction into a more radial direction for outlet.

By these inventive features a uniform distribution of gas streaming into the tube or streaming out of the tube is reached and the steady changement of gas flow direction prevents occurrence of the harmful wide-areal turbulances within the excitation tube. These inventive features and others which may further improve will become obvious from the following figures and the accompanying description. Specific examples of the invention are thus described by way of the following Figures.

BRIEF DESCRIPTION OF THE DRAWINGS

FIG. 3b A schematic cross-sectional view according to line III—III through the arrangement of FIG. 3a.

FIG. 5b A schematic length section view through the arrangement according to FIG. 5a.

FIG. 7a–c A schematic cross-sectional view through an excitation tube preventing the occurrence of wide areal turbulances.

FIG. 8 A schematic axial section view of an inventive gas oulet arrangement.

FIG. 9 A view analoguous to that of FIG. 8 in a further kind of realization.

FIG. 1 in principle shows the arrangement of a known high power gas laser. The laser shown is a two-stage laser with a first stage left-hand of the dotted line and a second stage right-hand thereof. As the laser arrangement is symmetrically built with respect to that dotted line only the stage left-hand of that line will be described. The arrangement comprises an excitation stage tube 1 at one end of which a cathode 3 and on the other end of which an anode 5 being provided. At one end of the excitation stage tube 1 an inlet pipe 9 discharges into an inlet zone 7 and at the other end a discharge pipe 11 departs from an outlet zone 13 of the excitation stage tube 1. With the help of a blower 15 provided with an input and outlet side heat exchanger 17 and 19 a gas mixture as of carbonic acid, nitrogen and hydrogen is driven through the excitation stage tube 1 in the direction shown by the arrow. The central axis A of the both side opened excitation stage tube is the optical axis of the laser beam. As is further shown the electrodes 3 and 5 are fed by means of a high tension source 21, a control arrangement for instance in the form of a high voltage tube 23 whereby the tube 23 and a current regulation 25 controlling the tube give the possibility to adjust the electrode current. The present invention is directed among others on measures at the inlet zone 7 and/or the outlet zone 13, additionally to features for the cathode and/or anode, all of these measures aerodynamically and/or chemically preventing the occurrence of wide areal turbulances within the excitation stage tube 1 and favouring a good mixture of the gas therein.

By the help of the FIG. 2 to 16 measures which prevent wide areal turbulances within the excitation stage tube are described.

Thereby the most important features, considered as primarily inventive, are shown and described in FIG. 5a to 6 and 8 to 12.

Figure 2A:
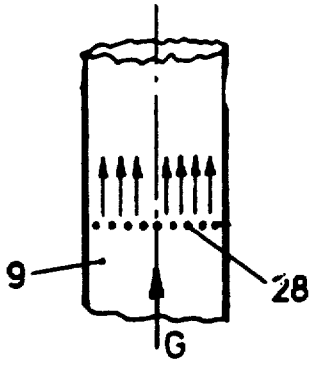
FIG. 2a Schematically a section of a gas inlet pipe with means to prevent the occurrence of a wide-areal turbulances.
Figure 2B:
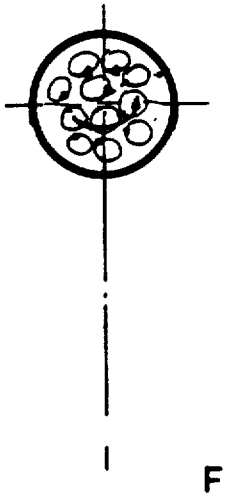
FIG. 2b A cross-sectional view of the arrangement according to FIG. 2a qualitatively showing the small areal turbulances to be realized.
Figure 3A:
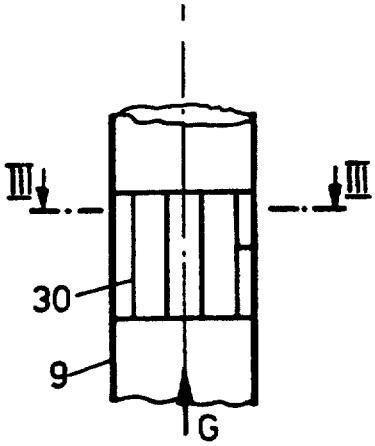
FIG. 3a A view similar to that of FIG. 2a with a second kind of realization of the preventing means.
Figure 3B:
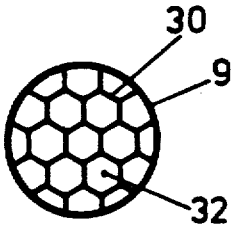
Figure 4:
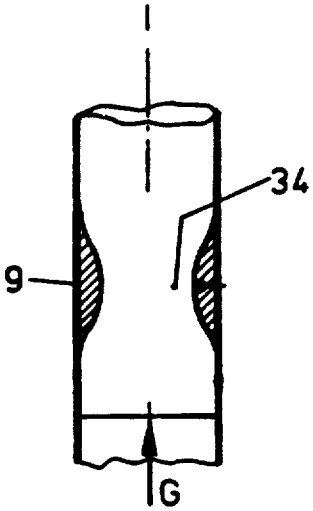
FIG. 4 A view analoguous to FIGS. 2a and 3a with a further form of realization of means to prevent wide areal turbulances to occur.
Figure 5A:
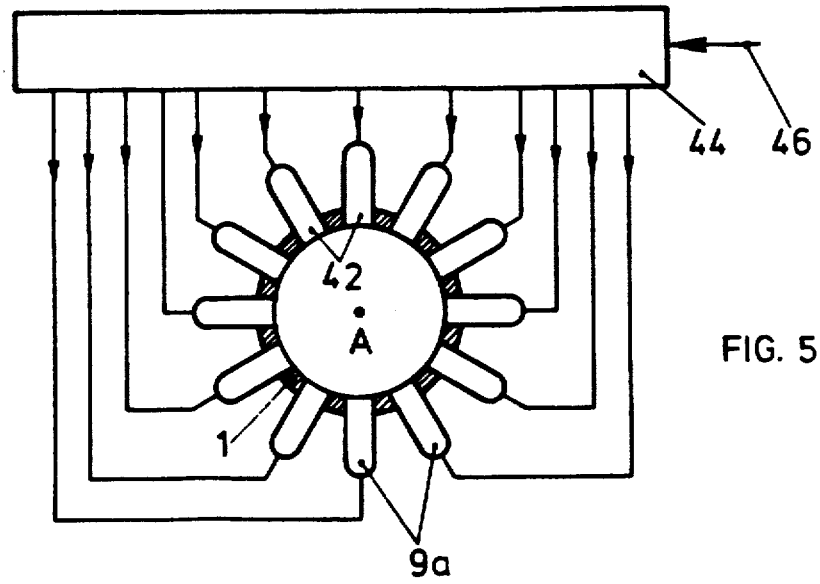
FIG. 5a A schematic cross-sectional view through an inventive inlet arrangement of an excitation tube.
Figure 5B:
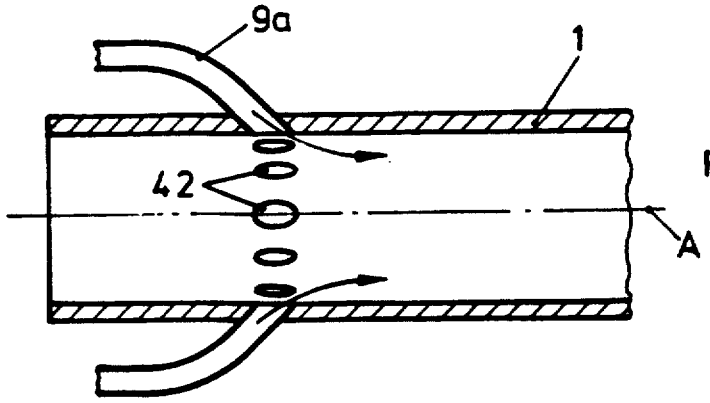
Figure 6:
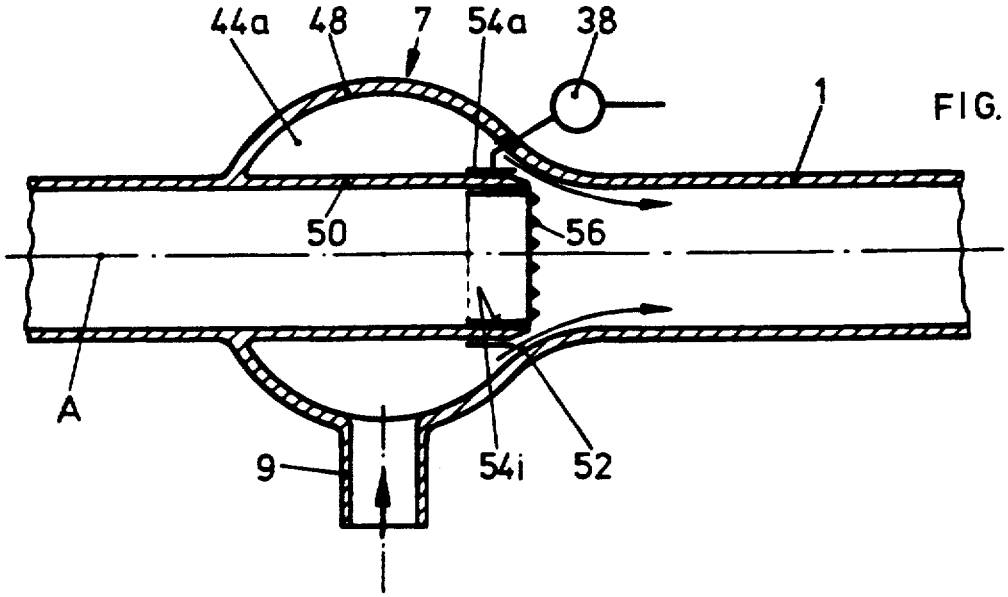
FIG. 6 A part of an axial section view analoguous to that of FIG. 5b of a preferred form of realization of the inventive inlet arrangement of FIG. 5.

In FIGS. 2 to 4 there are shown respective parts of a gasfeed pipe or inlet pipe 9 which may be used together with the inventive inlet arrangement of FIGS. 5 to 6. In vicinity of the inlet zone 7, as shown in FIG. 2a, there is provided within the inlet pipe 9 one or more than one grids 28, preferably as shown, deposited in cross-sectional planes. By this provision there are generated small areal turbulances within pipe 9 as schematically shown in FIG. 2b. Wide areal turbulances, as also shown in FIG. 2b, are substantially prevented from occuring and propagating into the excitation tube 1. In FIG. 3a the grid 28 is replaced by multitude of walls 30 within the inlet pipe 9 which latter subdivides the flow cross-section.

As shown in FIG. 3b these walls 30 are preferably arranged to form a honey comb pattern 32. The arrangement of such walls too results in the above effect with respect to occurrence of small and prevention of wide areal turbulances.

FIG. 4 shows a further kind of measure for the same target. Here the inlet pipe 9 is provided with steady cross-sectional narrowing 34, said narrowing being realized by a steady convergence, then a steady divergence of the wall in gas flow direction. This measure too provides the above mentioned turbulance characteristics. The measures described by FIGS. 2 to 4 may be, if necessary, provided each separately or may be combined with each other in combination with the inlet arrangement shown and described later with the help of FIGS. 5 and 6.

Primarily the generation of wide areal turbulances with respect to the cross-sectional area of the excitation tube is prevented by measures which will now be described with the help of FIGS. 5 and 6. In FIG. 5a the technique to solve this problem is generally shown. Along the circumference of the excitation stage tube 1 gas inlet openings 42 are provided either continuously or and as shown in the FIGS. 5a and 5b discontinuosly distributed which latter are fed via a set of inlet pipes 9a and which direct the stream of gas steadily from a more radial into a more axial direction, with respect to tube 1, this uniformly along the tube's periphery.

As shown in FIG. 5b the direction of the flow channels in the pipes 9a at the inlet openings 42 is so that the gas inlet does at least substantially occur in direction of the axis A into the excitation stage tube 1, steadily and without encountering any corners where turbulances would be generated.

To further make sure that departing from a common pressure gas feed pipe for inlet openings 42 or inlet pipes 9a all inlet openings 42 provided are fed equally, all these inlet pipes 9a are led to one common equalizing chamber 44, as schematically shown in FIG. 5a, which latter, on its turn, is fed by one gas inlet tube 46. By this technique a uniform substantially axial directed gas inlet flow along the circumference of the excitation stage tube 1 is realized. The features of FIGS. 2 to 4 can be, if necessary, incorporated in the inlet pipes 9a.

FIG. 6 shows a preferred embodiment of the inlet arrangement. The excitation stage tube 1 is provided at its inlet side with an enlargement 48 of its wall. Together with continuation part 50 of the excitation stage tube 1 which has the same inner diameter as the tube itself at its inlet zone there is realized an equalizing chamber 44a as an annular chamber around the axis A into which there is led at least one inlet feed pipe 9. The outlet from the annular equalizing chamber 44a is between the end of the part 50 directed towards the excitation stage tube and the beginning of the enlargement 48 whereby there is realized by these two parts steadily narrowing annular ring nozzle 52. Thus there is realized optimal uniformity of the gas discharge into the tube 1 predominantly in axial direction. As shown in that figure there may be provided alternatively or additively on the inner side of the part 50 and on its outer side i.e. directed towards the annular equalizing chamber 44a along the tube circumference, annular electrodes 54 and the tube circumference, annular electrodes 54 and 54a. The further possibility to use the wall of the tube part 50 directly as an electrode is not shown within the Figures. The electrode in principle of annular form may be made as will be described below from independent electrode sectors deposited along the circumference which are electrically isolated from each other. Preferably these distinct, spacial electrode sectors or uninterrupted electrode rings carry sharp corners directed towards the excitation stage tube 1 as shown at 56 to generate locally very high field strength.

The FIGS. 7a to 7c show measures which may be introduced if necessary to further improve turbulance behaviour and which are provided at the excitation stage tube itself.

It is known that the tendency that single and thus wide areal turbulances occur over the flow cross-section of a tube is the higher the more the tube cross-section is exactly circular. As it is a target of all measures proposed to prevent that occurrence the flow cross-section of the excitation stage tube 1 departs according to FIGS. 7a to 7c from the circular form and shows for instance a triangular, four-angular, poly-angular or elliptical shape. The occurrence of symmetrical but small areal turbulances are shown in the FIG. 7. These turbulances favour a good mixture of the gas which flows axially through the excitation stage tube 1.

The FIGS. 8 to 12 show important measures and respective at the outlet zone 13 of the excitation stage tube 1. To make sure that the gas outlet does not act backwards into the excitation stage tube as concerns the occurrence of wide areal turbulances there is inventively provided as shown in FIG. 8 at the outlet zone 13, in analogy to the measures proposed at the inlet zone according to FIG. 5b, an outlet arrangement which is shown in FIG. 8 with openings 58 discontinusly arranged along the circumference of the excitation stage tube 1 or continuously formed as shown in FIG. 9. They steadily lead the outlet gas from a more axial direction into a more radial direction with respect to the tube 1. According to FIG. 8 outlet openings 58 are distributed along the circumference of the tube 1 which all are provided with steady bent outlet pipes 11a which latter communicate (not shown) with a collecting chamber.

According to FIG. 9 there is provided at the outlet zone a steadily continuously widening annular outlet slot 60 around the circumference of tube 1 this ring slot being realized by enlarging the tube 1 and introducing at the side opposite to the tube 1 a tube sector 64 into said enlargement 62 so that there is formed a collecting annular chamber 66 around axis A and the annular outlet slot 60. The collecting chamber 66 communicates with the outlet pipe 11. Here too there is proposed to arrange in the region of the outlet slot 60 an electrode as a cathode 68 e.g. a ring cathode with unsteady contours 70 and with a coresponding electrical tap 72.

The kind of realization according to FIG. 10 shows again an annular chamber 66 formed by enlarging the diameter of the tube whereby a multitude of ring lamellas 74 provide for several ring outlet slots 60a, 60b . . . one behind the other which provide for steady changement of gas flow direction. Here too the ring lamellas may be additionally used as electrodes as a cathode and are then provided with electric taps 72.

Figure 1:
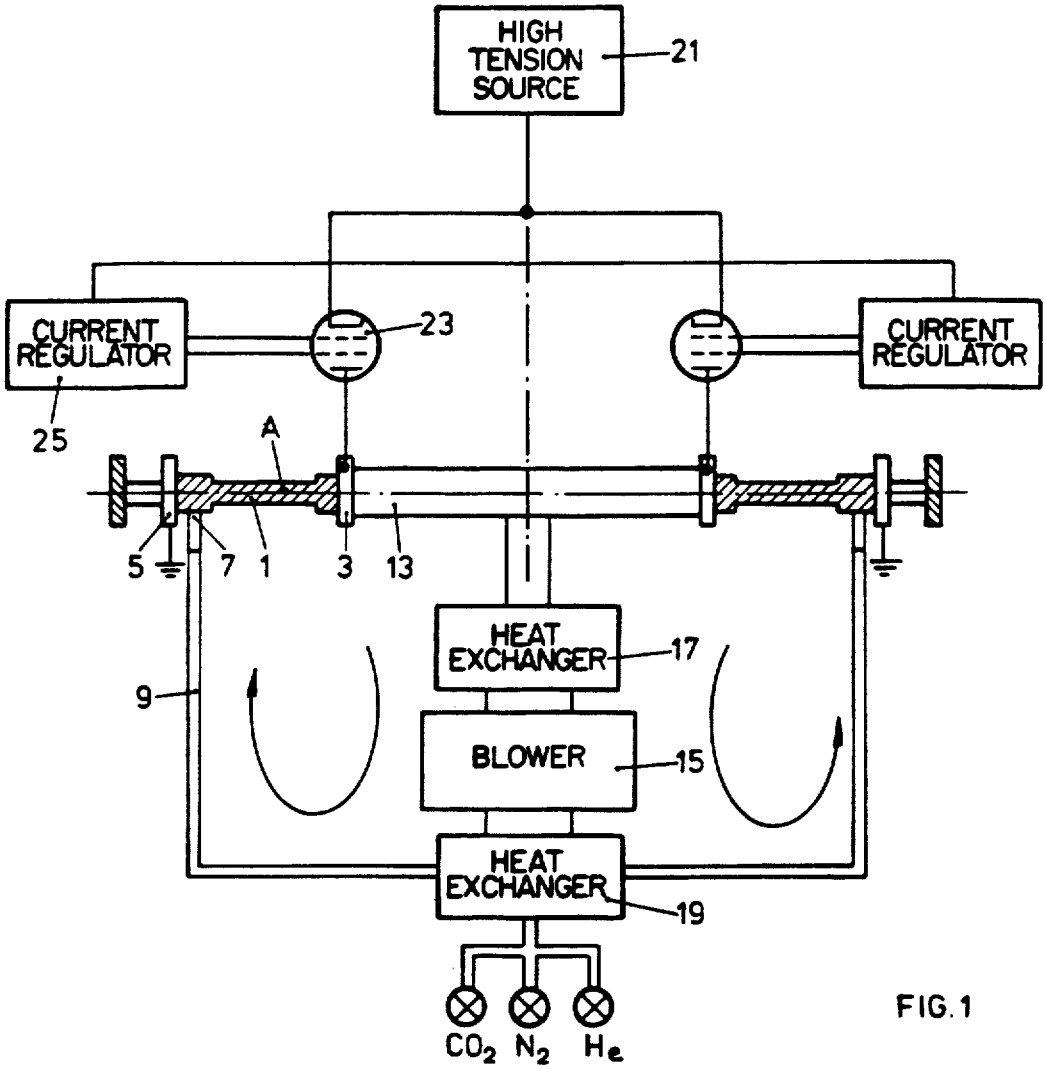
FIG. 1 In principle a "two-stage" high power axial gas laser.
Figure 10:
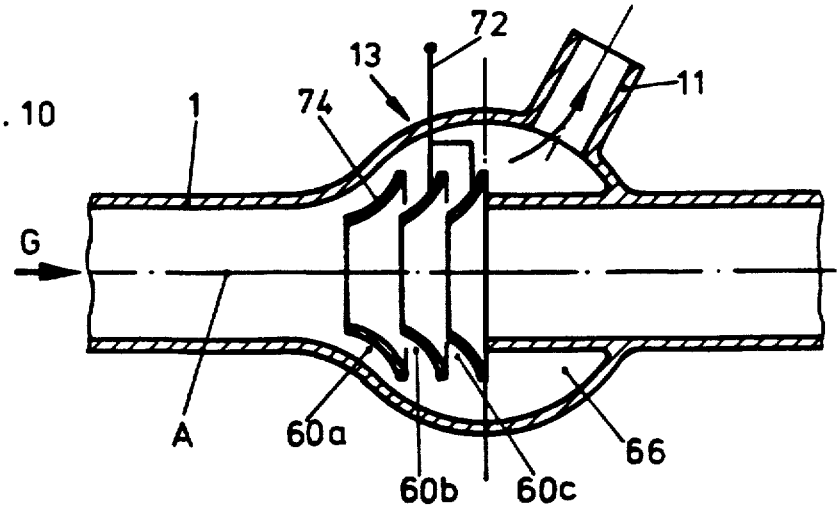
FIG. 10 By means of a view analogous to that of the FIGS. 8 and 9 a further form of realization of the inventive outlet arrangement.
Figure 11:
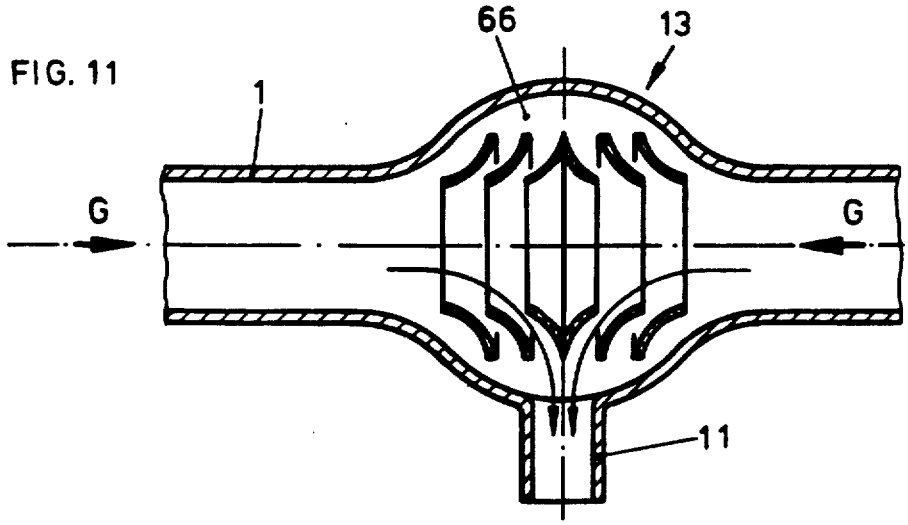
FIG. 11 The arrangement according to FIG. 10 for a two-stage laser as shown in FIG. 1.

FIG. 11 schematically shows the construction of the outlet zone 13 in analogy to the construction shown in FIG. 10 but for a two stage laser as shown in FIG. 1.

Figure 12:
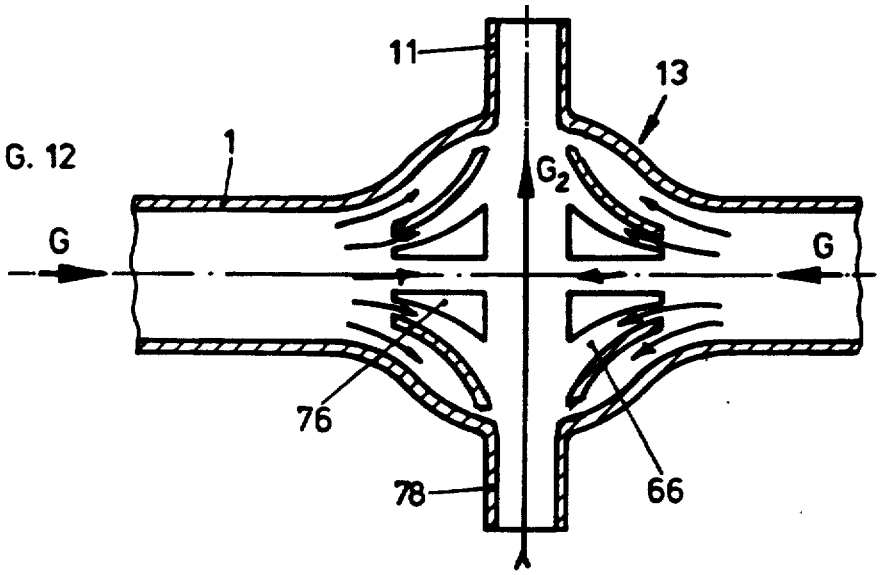
FIG. 12 A schematic view of a further kind of realization of the inventive outlet arrangement.

FIG. 12 shows an arrangement which is in principle analoguous to that shown in FIG. 11 i.e. provided for a two-stage laser. Instead of continuous annular lamellas one of several bucket rings 76 are provided. To favour the gas to discharge into the outlet pipe 11 especially the realization forms of the FIGS. 10 to 12 and as shown in FIG. 12 can be provided with an additional high pressure gas pipe 78 ending within the collecting chamber 66 and preferably having a mouth which is arranged coaxially to the mouth of the pipe 11. Through this high pressure gas pipe 78 a beam G2 is blown through the chamber 66 and favours in the sense of vectorial addition of the gas beam impacts the exhaust of the gases G coming from the excitation stage tube 1.

Figure 13:
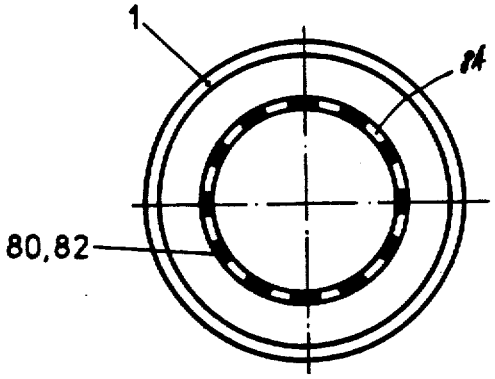
FIG. 13 A schematic cross-sectional view through an excitation stage with subdivided electrodes.
Figure 14:
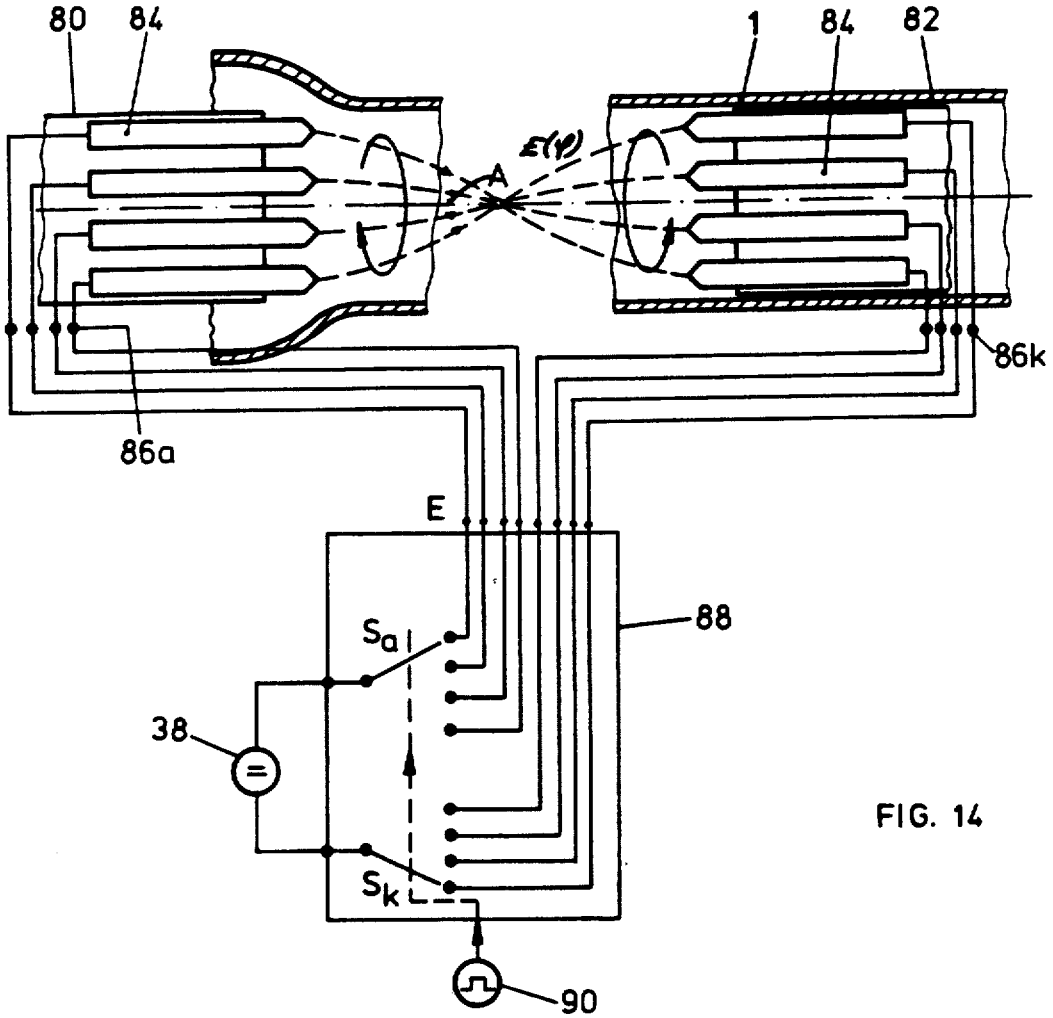
FIG. 14 A schematic axial cross-section through a laser excitation tube with electrodes realized as shown in FIG. 13 on the anode and on the cathode side and with a field pattern control means.

The FIGS. 13 and 14 show an electrode arrangement of a cathode and/or anode which has the target to realize desired turbulance characteristics eventually in combination with one or several of the measures described up to now, now on an electrical way. For this purpose the anode 80 and/or the cathode 82 are in principle formed as ring electrodes. The ring is as especially shown in FIG. 13 not continuously used as an electrode but presents axially directed single electrode dips 84, isolated from each other.

These electrode dips 84 are mounted so as to be electrically isolated from each other and are each provided with an electric contact 86. As shown in the Figure the electrode dips 84 of the anode 80 are connected to connections 86a O those of the cathode 82 to connections 86k which are each accordingly led to inputs of a control unit 88. The control unit 88 is fed with a clock signal from a generator 90 and from a high tension source 38. The unit 88 acts as a multiplexer unit with multiplexer switches $S_a$ and $S_k$ which switch simultaneously a preselectable one or more than one of the anode electrode dips 84 and one or more than one of the cathode electrode dips 82 on to the high tension source 38. If for instance on the anode and on the cathode side there is switched simultaneously one electrode dip each the field pattern along the excitation stage 1 will be governed by the circulating angular position of these dips simultaneously connected to the voltage source with respect to the axis A. As shown there can be realized an electrical eddy field pattern with the help of which the gas turbulance within the excitation stage tube may be influenced.

Figure 15:
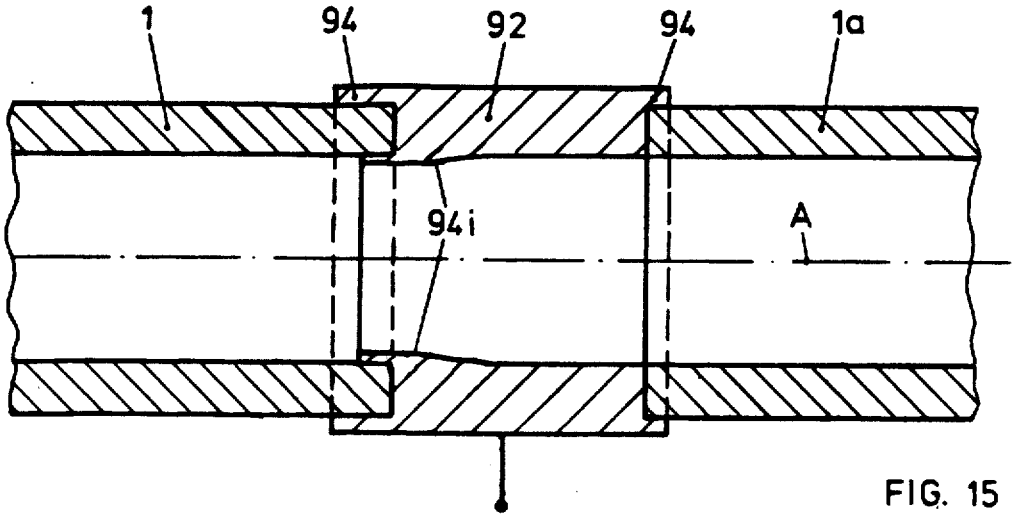
FIG. 15 By means of an excitation tube's axial section a further kind of electrode construction.
Figure 16:
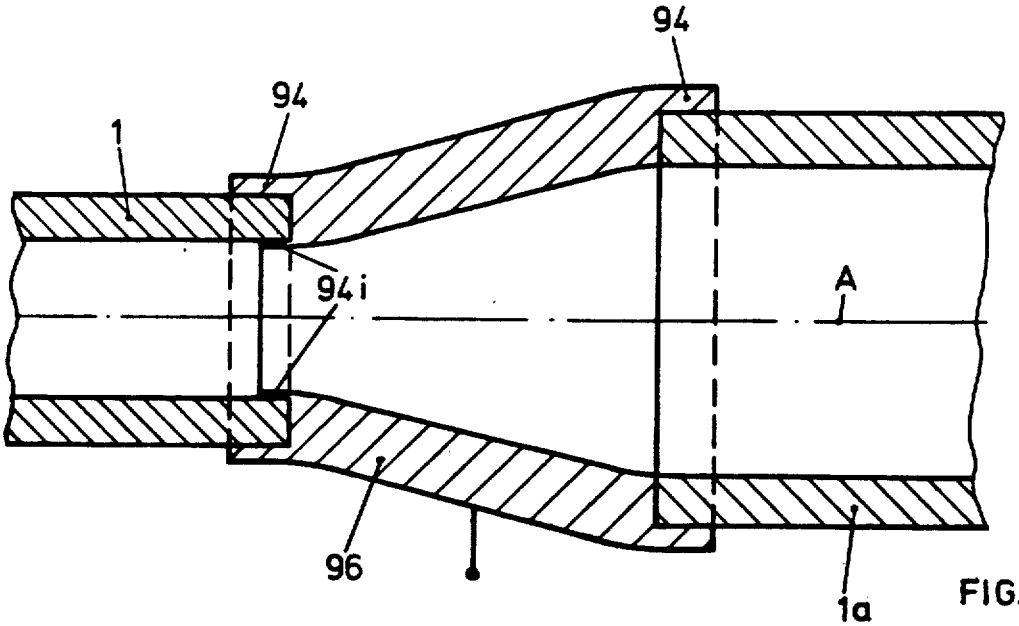
FIG. 16 On a view analoguous to that of FIG. 15 a further form of realization of the electrode shown therein.

The FIGS. 15 and 16 show further electrode arrangements for anode and/or cathode application to further fulfill the object mentioned above as concerns the occurrence of turbulances within the excitation stage tube if necessary. Between the excitation stage tube 1 and its continuation part 1a for the laser beam along axis A the electrode is, as shown in. FIG. 15, mounted as a cylindrical electrode 92. The cylinder electrode is so dimensioned that it forms substantially no stop with respect to the inner wall of the tube 1 and 1a respectively. The electrode rests for instance with circular collars 94 against the tube 1 and 1a. If following the excitation stage tube 1 the cross-sectional dimension of a continuation tube 1a has to be changed with respect to the cross-sectional area of the excitation stage tube 1 then the electrode is made in a divergent shape as shown in FIG. 16 for the electrode 96, whereby the inner walls of the tube 1 and 1a are again linked substantially without any stops and, radially, without any groove which is realized with a thin interior collar 94i.

I claim:

1. In an axial flow gas transport laser comprising an excitation tube *with an internal surface* through which gas flows along an axis of said tube, an inlet arrangement *located at one end of said excitation tube* to feed gas towards said excitation tube, and an outlet arrangement *located at the other end of the excitation tube* to discharge gas from said excitation tube *whereby the gas fed to said excitation tube flows along the axis of the tube over the entire length of the tube between the inlet arrangement and the outlet arrangement*, the improvement comprising at least one of said inlet and outlet arrangements comprising a circumferential opening arrangement evenly distributed along the periphery of said excitation tube, [substantially] in a cross-section plane of said tube, and a gas flow channel arrangement *with internal channel surfaces leading* to said opening arrangement, said gas flow channel arrangement at said opening arrangement being directed at least [substantially] *predominately* in the direction of the excitation tube axis [and into the excitation tube] , *an internal channel surface of said gas flow channel arrangement steadily transmitting into said internal surface of said tube along a portion of said opening arrangement* for preventing wide [serial] *areal* turbulances of the flowing gas in said excitation tube.

2. The laser according to claim 1, wherein the axes of said gas flow channel arrangement at said opening arrangement define a symmetrical cone around said axis of said excitation tube.

3. The laser according to claim 1, wherein said opening arrangement comprises a ring gap.

4. The laser according to claim 1, wherein said flow channel arrangement communicates with an equalizing chamber, said equalizing chamber being connected with one of a gas feed arrangement and a gas discharge arrangement.

5. The laser according to claim 4, wherein said equalizing chamber comprises an annular chamber around said axis of said excitation tube.

6. The laser according to claim 1, wherein said opening arrangement being at least in part defined by at least parts of an electrode arrangement for electrically exciting said gas within said excitation tube.

7. The laser according to claim 1, wherein said opening arrangement comprises at least two circumferential opening rings disposed in spaced relationship at the circumference of said excitation tube.

8. The laser according to claim 1, wherein said outlet arrangement comprises at least one bucket ring arranged along the circumference of said excitation tube.

9. The laser according to claim 1, wherein said outlet arrangement comprises a pressure gas pipe and a gas discharge pipe, the opening of said pressure gas pipe being disposed opposite an opening of said gas discharge pipe and the axis of said pressure gas pipe being substantially aligned with the axis of said discharge gas pipe so as to improve gas discharge through said gas discharge pipe by pressurized gas entrained discharge.

10. The laser according to claim 1, wherein at least a part of said excitation tube has an inner cross-section departing from circular form.

11. The laser according to claim 1, further comprising an electrode arrangement to excite said gas within said excitation tube, said electrode arrangement comprising at least one electrode disposed along the circumference of the inner wall of said excitation tube, substantially without forming at least one of a circumferential stop and a circumferential groove at said inner wall.

12. The laser according to claim 11, wherein said electrode forming an even link from one part of said excitation tube of a first inner diameter to a second part thereof of a second inner diameter disposed coaxially to said one part.

13. The laser according to claim 1, further comprising an electrode arrangement at said excitation tube for electrically exciting said gas within said excitation tube and electrical control means connected to said electrode arrangement for controlling the electrical field pattern within and along said excitation tube.

14. The laser according to claim 13, wherein said electrode arrangement comprises at least one electrode formed by several sub-electrodes separately disposed around said axis of said excitation tube, said electrical control means comprising a control unit, connected to said sub-electrodes for electrically feeding said sub-electrodes in a predetermined time sequence.

15. The laser according to claim 1, wherein said inlet arrangement comprises a gas-feed-pipe arrangement with dividing means, sub-dividing the inner cross-section of said gas-feed-pipe arrangement into a multitude of separate flow paths.

16. The laser according to claim 15, wherein said dividing means comprises at least one grid arranged within said gas-feed-pipe arrangement.

17. The laser according to claim 15, wherein said dividing means comprising a multitude of sub-dividing walls.

18. The laser according to claim 17, wherein said walls are arranged in the form of a honey comb pattern.

19. The laser according to claim 1, wherein said inlet arrangement comprises a gas-feed-pipe arrangement, said gas-feed-pipe arrangement comprising a steady diminishment of its inner cross-section followed by a steady re-enlargement of its inner cross-section.

* * * * *